United States Patent
Li et al.

(10) Patent No.: US 11,160,088 B2
(45) Date of Patent: Oct. 26, 2021

(54) DATA TRANSMISSION METHOD AND DEVICE, AND STORAGE MEDIUM

(71) Applicant: XI'AN ZHONGXING NEW SOFTWARE CO., LTD., Xi'an (CN)

(72) Inventors: Xincai Li, Shenzhen (CN); Yajun Zhao, Shenzhen (CN); Ling Yang, Shenzhen (CN); Hanging Xu, Shenzhen (CN)

(73) Assignee: Xi'an Zhongxing New Software Co., Ltd., Xi'an (CN)

( * ) Notice: Subject to any disclaimer, the term of this patent is extended or adjusted under 35 U.S.C. 154(b) by 142 days.

(21) Appl. No.: 16/476,255

(22) PCT Filed: Dec. 25, 2017

(86) PCT No.: PCT/CN2017/118416
§ 371 (c)(1),
(2) Date: Jul. 5, 2019

(87) PCT Pub. No.: WO2018/126932
PCT Pub. Date: Jul. 12, 2018

(65) Prior Publication Data
US 2019/0357224 A1    Nov. 21, 2019

(30) Foreign Application Priority Data
Jan. 6, 2017  (CN) .......................... 201710011423.7

(51) Int. Cl.
*H04W 72/08* (2009.01)
*H04W 72/12* (2009.01)
(Continued)

(52) U.S. Cl.
CPC ........ *H04W 72/082* (2013.01); *H04B 17/345* (2015.01); *H04W 72/042* (2013.01); *H04W 72/0446* (2013.01)

(58) Field of Classification Search
CPC ........... H04W 72/082; H04W 72/0446; H04W 72/0406; H04W 72/085; H04B 17/345
See application file for complete search history.

(56) References Cited

U.S. PATENT DOCUMENTS

| 6,694,141 B1 | 2/2004 | Pulkkinen et al. |
| 9,265,048 B2 | 2/2016 | Sampath et al. |

(Continued)

FOREIGN PATENT DOCUMENTS

| CN | 105743626 A | 7/2016 |
| CN | 106301733 A | 1/2017 |

(Continued)

OTHER PUBLICATIONS

International Search Report of corresponding PCT Application No. PCT/CN2017/118416—4 pages (dated Mar. 6, 2018).

(Continued)

*Primary Examiner* — Faruk Hamza
*Assistant Examiner* — Abusayeed M Haque
(74) *Attorney, Agent, or Firm* — Knobbe Martens Olson & Bear LLP

(57) ABSTRACT

Provided are a data transmission method and device and a storage medium. The method includes: determining a first time domain resource for transmitting data according to first preset information, where the first preset information includes at least one of: indication information from a base station, a sensing result for a channel and a measurement result for interference; and transmitting the data by using the determined first time domain resource.

17 Claims, 4 Drawing Sheets

(51) Int. Cl.
*H04B 17/364* (2015.01)
*H04B 17/345* (2015.01)
*H04W 72/04* (2009.01)

(56) References Cited

U.S. PATENT DOCUMENTS

| | | | |
|---|---|---|---|
| 10,785,009 B2* | 9/2020 | Zhang | H04W 72/082 |
| 2010/0008244 A1 | 1/2010 | Sampath et al. | |
| 2010/0110929 A1 | 5/2010 | Li et al. | |
| 2014/0015660 A1* | 1/2014 | Ogusa | G08G 1/163 340/435 |
| 2014/0198642 A1* | 7/2014 | Barriac | H04W 74/08 370/230 |
| 2016/0165622 A1* | 6/2016 | Luo | H04L 1/0028 370/329 |
| 2017/0223694 A1* | 8/2017 | Han | H04W 72/1284 |
| 2017/0303144 A1* | 10/2017 | Guo | H04W 74/0808 |
| 2018/0007688 A1 | 1/2018 | Fu et al. | |
| 2018/0091273 A1* | 3/2018 | Choi | H04L 5/0048 |
| 2018/0359762 A1* | 12/2018 | Xiong | H04W 72/085 |
| 2018/0376495 A1* | 12/2018 | Lee | H04L 5/00 |
| 2018/0376497 A1* | 12/2018 | You | H04L 5/0053 |
| 2020/0187228 A1* | 6/2020 | Cheng | H04W 72/1289 |
| 2020/0305130 A1* | 9/2020 | Kang | H04L 5/0051 |

FOREIGN PATENT DOCUMENTS

| | | |
|---|---|---|
| EP | 0983704 A1 | 3/2000 |
| WO | 2006/120990 A1 | 11/2006 |

OTHER PUBLICATIONS

"HARQ timing and resource of PUCCH", 3GPP TSG—RAN WG 1 Meeting #87 R1-1611290 (Nov. 18, 2016).
Extended European Search Report of corresponding European Patent Application No. 17890409.0—11 pages (dated Jul. 21, 2020).

* cited by examiner

DATA TRANSMISSION METHOD AND DEVICE, AND STORAGE MEDIUM

CROSS REFERENCE TO RELATED APPLICATION

This is a National stage application, filed under 37 U.S.C. 371, of International Patent Application NO. PCT/CN2017/118416, filed on Dec. 25, 2017, which claims the priority to a Chinese patent application NO. 201710011423.7 filed on Jan. 6, 2017, disclosures of which are incorporated herein by reference in their entirety.

TECHNICAL FIELD

The present disclosure relates to communications and, in particular, to a data transmission method and device, and a storage medium.

BACKGROUND

The 5G technologies need to solve some problems posed by diverse application scenarios. For example, low-latency applications have high requirements on the latency and need to provide users with an end-to-end latency on the order of millisecond. At the same time, to achieve a forward compatibility in the 5G communication technologies, a support for traffic adaptation is an inevitable trend in communication. The traffic adaptation refers to semi-static configuration or dynamic configuration of uplink and downlink, so as to meet traffic load requirements or match traffic load changes. Therefore, how to support or implement flexible duplex or dynamic time division duplexing (TDD) is the first problem to be solved. This above problem has not yet been developed in the discussion of the third generation partnership project (3GPP) standard. At the same time, if each cell changes the frame structure according to traffic load dynamic adaptation or performs flexible duplex according to uplink and downlink configuration, the Cross link interference (CLI) problem of DL-to-UL interference (also referred to as eNB-to-eNB interference) or UL-to-DL interference (also referred to as UE-to-UE interference) between the adjacent cells may be brought and influence the data transmission performance.

In addition, the problems related to processes of scheduling and hybrid automatic repeat request (HARQ) caused by the flexible duplex should also be considered. Especially for a case of uplink and downlink dynamically change or a case of severe cross link interference, how to transmit original scheduled data is a problem that should be solved.

Therefore, unable to implement dynamic uplink and downlink data transmission according to traffic requirements is the problem in the existing art.

SUMMARY

Embodiments of the present disclosure provide a data transmission method and device, and a storage medium.

An embodiment of the present disclosure provides a data transmission method. The method includes: determining a first time domain resource for transmitting data according to first preset information, where the first preset information includes at least one of: indication information from a base station, a sensing result for a channel and a measurement result for interference; and transmitting the data by using the determined first time domain resource.

Optionally, the first time domain resource includes a time domain start location and a time domain length.

Optionally, the time domain length includes: k time units, where k is a variable and is an integer greater than or equal to 1; each of the k time units includes at least one of: a subframe, a slot, a mini-slot, an orthogonal frequency division multiplexing (OFDM) symbol.

Optionally, the indication information includes at least one of: a media access control control element (MAC CE); a radio resource control (RRC) message; dynamic downlink control information (DCI); configuration adjustment information for indicating uplink and downlink structures of the first time domain resource; information for indicating a candidate time domain location for sensing the channel; information for indicating a candidate time domain location for measuring the channel; information for domain start location of a plurality of pre-configured candidate first time domain resource; and parameter information for indicating a transmission of the data.

Optionally, the parameter information comprises at least one of: a number of slots for a data transmission, a number of mini-slots, a number of symbols, a modulation and coding scheme (MCS) indication, a frequency domain resource location, hybrid automatic repeat request (HARQ) process number information, transmission time domain location information of a cross link measurement signal, transmission start time domain location information, transmission end time domain location information, a beam indication or power control information; where the parameter information is determined through one piece of DCI or at least two pieces of DCI.

Optionally, the two pieces of DIC satisfies at least one of: the two pieces of DCI have different time domain locations; first-level DCI in the two pieces of DCI includes at least one of: a carrier indication, resource allocation, pilot resource allocation, an MCS, a scheduling transmission timing, an acknowledgement (ACK) or non-acknowledgement (NACK) feedback timing, a number of scheduled slots, power control, a HARQ process number, a new data indication, a redundancy version, a beam index indication, precoding information, a channel state request indication, a trigger transmission indication for aperiodic sounding signal, and a sensing access priority; and a second-level DCI in the two pieces of DCI includes at least one of: an adjusted carrier indication, adjusted resource allocation, an adjusted MCS, scheduling transmission trigger indication information, an adjusted transmission timing, an adjusted ACK/NACK feedback timing, an adjusted number of slots, adjusted power control, an adjusted HARQ process number, an adjusted beam index.

Optionally, the two pieces of DCI satisfies at least one of: the scheduling transmission timing of the first-level DCI is time domain offset information relative to a time domain location in which the second-level DCI is located; and adjusted information included in the second-level DCI is one piece of offset information based on the first-level DCI.

Optionally, a unit adjusted by the configuration adjustment information includes at least one of: a subframe, a slot, a mini-slot, and an orthogonal frequency division multiplexing (OFDM) symbol.

Optionally, the configuration adjustment information performs configuration adjustment on the uplink and downlink structures of the first time domain resource through at least one of: providing uplink and downlink configuration structures of subsequent k subframes or slots by using the first-level DCI, informing slots for changing a frame structure by using the second-level UE-specific DCI or UE-group-specific DCI, where k is a variable and is an integer greater than or equal to 1; configuring one initial configuration by using DCI or a semi-static RRC message, and providing the uplink and downlink configuration structures of the slots through common DCI; giving the uplink and downlink configuration structures of the subsequent k subframes or slots by using the common DCI, in response to a change of the first time domain resource, obtaining changed information by an implicit mapping between a UL grant and a DL grant; and determining the uplink and downlink configuration structures by using a structure of a reference signal.

Optionally, in the condition that the indication information indicates the uplink and downlink structures of the first time domain resource change, the indication information includes: information for indicating the transmission of the data, where the translation includes: translating data of a time unit in a changed a transmission direction, where a length of the translation is p codirectional time units, in response to encountering a time unit with a different transmission direction during the translation process, deferring the transmission backwards sequentially, where p is a variable and is an integer greater than or equal to 1.

Optionally, before determining the first time domain resource for transmitting the data according to the first preset information, the method further includes: sensing the channel by at least one of manners: detecting an energy or an interference intensity of the channel, where detecting the energy of the channel includes: detecting an energy on one resource group or one Physical Resource Block (PRB), and a statistical unit used in performing energy statistical calculation is one resource group or one PRB; detecting whether other devices at a network side transmit a cross link reference signal identifier on the channel, and determining whether a neighboring cell device performs reverse link data transmission on the channel according to a detection result of the cross link reference signal identifier.

Optionally, before determining the first time domain resource for transmitting the data according to the first preset information, the method further includes: measuring the interference through the following manner: determining a magnitude of cross link interference by measuring a specific signal, where the specific signal includes a sounding signal or a demodulation reference signal transmitted by other terminals.

Optionally, after determining the magnitude of cross link interference by measuring the specific signal, the method further includes: informing in a predefined time window, according to a pre-configured cycle, the base station of a determined interference measurement result in an ACK or NACK implicit manner, or in a reporting manner of the CSI.

Optionally, before determining the first time domain resource for transmitting the data according to the first preset information, the method further includes: sensing the channel and/or measuring the interference through the manner: performing channel sensing and/or interference measuring from a first sensing location in a sequential order of pre-configured candidate sensing locations; where in response to determining that a sensing result of the channel sensing and/or the measure result of the interference measuring at a nth candidate location is less than a preset threshold, determining a start location of the nth candidate sensing location as a location for starting data transmission, n=1, 2 . . . m, m is a total number of locations configured for the channel sensing or the interference measuring, or a number of candidate time domain start locations for the data transmission; otherwise, determining a pre-configured uplink location as a location for the data transmission.

Optionally, the method further includes: when a length of the first time domain resource dynamically changes, adjusting data transmission through at least one of manners: reperforming a rate matching according to an indicated MCS, where a value of the indicated MCS is a preset value or is an initial MCS value plus multiple offset values, and in response to determining that multiple indicated MCSs are provided, the plurality of indicated MCSs are on a one-to-one correspondence with candidate sensing locations; converting a transport block size for transmitting the data, and adjusting f the transport block size; and transmitting the data according to scheduling information corresponding to the changed length of the first time domain resource.

Optionally, in response to determining that a physical uplink shared channel (PUSCH) starts transmitting from a qth scheduled slot, adjusting the transport block size includes one of: after converting a number of allocated RBs to ((the number of RBs)*a), obtaining an integer number of RBs after a converted value is rounded up or down, and searching a table to determine the transport block size according to the integer number of RBs and a modulation coding indication parameter $I_{MCS}$ indicated by scheduling signaling; after determining, via a table, an initial transport block size (TBS) through the number of RBs and $I_{MCS}$ indicated by the scheduling signaling, performing an operation of TBS (TBS*a) on an initial TBS to obtain a temporary TBS, searching a TBS value closest to the temporary TBS from a TBS table, and taking the TBS value closest to the temporary TBS in the TBS table as a TBS transmitted by the PUSCH; keeping a code rate for transmitting the transport block unchanged, converting the TBS by a formula: (TBS+CRC)*a−CRC; searching a TBS closest to the converted TBS value from the TBS table as a TBS for transmitting the transport block and performing encoding modulation according to $I_{MCS}$ indicated by the base station; where q is a variable and is an integer greater than or equal to 1; a=(m−f+1)/m, f is a variable and is an integer greater than or equal to 1, and m includes at least one of: m is a total number of scheduled slots, each of m scheduled slots in a time domain is continuous or discrete, m is a total number of candidate locations configured for channel sensing or interference measurement, and m is a number of candidate time domain start locations for data transmission.

Optionally, when a time domain location of the first time domain resource changes, a new time domain location is determined in front of a time domain location of an ACK or a NACK message fed back by a receiving end.

Optionally, when a time domain length of the first time domain resource changes, a location of a demodulation reference signal of the data remains unchanged, where the location of the demodulation reference signal of the data is a predefined location.

Optionally, after receiving a message for indicating that the configuration adjustment information of the uplink and downlink structures of the first time domain resource t changes, the method further includes: blindly detecting scheduling information of the base station within a predefined time, where the scheduling information is scrambled by a dedicated identifier, and the scheduling information is used for indicating that the data is rescheduled to one of the following locations: other time domain locations, other frequency domain locations, other carriers and other beams; when the scheduling information fails to be detected within the predefined time, stopping transmission or reception of the data, or performing the transmission or reception of the data on a reserved resource.

Another embodiment of the present disclosure further provides a data transmission method. The method includes: determining a second time domain resource for transmitting data according to second preset information, where the second preset information includes at least one of: a sensing result for a channel and a measurement result for interference; transmitting the data by using the determined second time domain resource.

Optionally, the sensing result for the channel includes at least one of: obtaining the sensing result by sensing occupation information transmitted by a downlink channel indicated by a preset base station; and obtaining the sensing result by performing an energy measurement on a blank resource or a preset pattern.

Optionally, before determining the second time domain resource for transmitting the data according to the second preset information, the method further includes: measuring the interference through the following manners: performing interference measurement on a neighboring base station, and determining an interference of a link by measuring a cross link measurement signal, where the measurement signal includes at least one of: channel state information reference signal (CSI-RS), a demodulation reference signal (DMRS) and a discovery reference signal (DRS).

Optionally, the second preset information further includes: preset indication information, where the preset indication information includes at least one of: a number of uplink and downlink transmission slots, a number of mini-slots, a number of symbols, a modulation and coding scheme (MCS) indication, a frequency domain resource location, a hybrid automatic repeat request (HARQ) process number information, transmission time domain location information of a cross link measurement signal, candidate transmission start time domain location information, transmission end time domain location information, a beam indication, power control information, frame structure configuration information, adjusted uplink and downlink configuration information and indication information adjusted by scheduling.

Optionally, the adjusted uplink and downlink configuration information is determined according to the sensing result for the channel and channel state information fed back by a terminal; and the indication information adjusted by scheduling is determined according to the sensing result for the channel and channel state information fed back by a terminal.

Another embodiment of the present disclosure further provides a data transmission device. The method includes: a first determination module, which is configured to determine a first time domain resource for transmitting data according to first preset information, where the first preset information includes at least one of: indication information from a base station, a sensing result for a channel and a measurement result for interference; a first transmission module, which is configured to transmit the data by using the determined first time domain resource.

Optionally, the first time domain resource includes a time domain start location and a time domain length.

Optionally, the time domain length includes: k time units, where k is a variable and an integer greater than or equal to 1; each of the k time units includes at least one of: a subframe, a slot, a mini-slot, an orthogonal frequency division multiplexing (OFDM) symbol.

Optionally, the indication information includes at least one of: media access control control element (MAC CE); a radio resource control (RRC) message; dynamic downlink control information (DCI); configuration adjustment information for indicating uplink and downlink structures of the first time domain resource; information for indicating a candidate time domain location for sensing the channel; information for indicating the candidate time domain location for measuring the channel; information for indicating domain start locations of a plurality of pre-configured candidate first time domain resources; and parameter information for indicating a transmission of the data.

Another embodiment of the present disclosure further provides a data transmission device. The method includes: a second determination module, which is configured to determine a second time domain resource for transmitting data according to second preset information, where the second preset information includes at least one of: a sensing result for a channel and a measurement result for interference; a second transmission module, which is configured to transmit the data by using the determined second time domain resource.

Optionally, the sensing result for the channel includes at least one of: obtaining the sensing result by sensing occupation information transmitted by a downlink channel indicated by a preset base station; obtaining the sensing result by performing an energy measurement on a blank resource or a preset pattern.

Optionally, the device further includes a measurement module, which is configured to measure the interference before determining the second time domain resource for transmitting the data according to the second preset information through the following manner: performing interference measurement on a neighboring base station, and determining an interference condition of a link by measuring a cross link measurement signal, where the measurement signal includes at least one of: channel state information reference signal (CSI-RS), a demodulation reference signal (DMRS) and a discovery reference signal (DRS).

Another embodiment of the present disclosure further provides a storage medium. The storage medium is configured to store program codes for executing the steps described above.

That is, an embodiment of the present disclosure further provides a storage medium configured to store computer-executable instructions for executing any method described above when executed by a processor.

Through the embodiments of the present disclosure, since at least one piece of information (the indication information coming from the base station, the sensing result for the channel and the measurement result for interference) determines the first time domain resource for transmitting the data according to the first preset information, requirements of the interference and traffic priority are considered, and requirements transmitted according to requirement adaption of uplink and downlink traffics are satisfied, meanwhile, the problem of unable to implement dynamic uplink and downlink data transmission according to traffic requirements in the existing art is solved, reducing interference of data transmission, improving the probability of data transmission and ensuring the system performance.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure. In the drawings.

DETAILED DESCRIPTION

The present disclosure will be described hereinafter in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Figure 1:
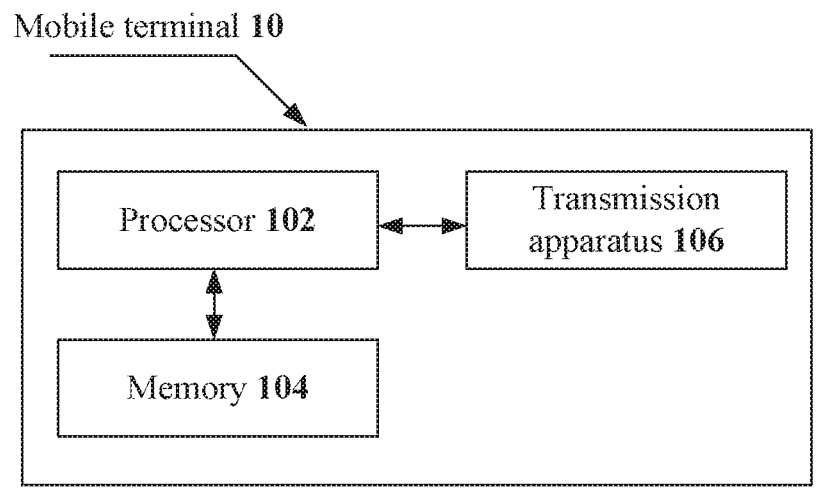
FIG. 1 is a block diagram of hardware of a mobile terminal of a data transmission method according to an embodiment of the present disclosure.

A method embodiment provided by the embodiment 1 of the present application may be executed in a mobile terminal, a computer terminal or other similar computing apparatuses. Taking the method to be executed in the mobile terminal as an example, FIG. 1 is a block diagram illustrating a hardware structure of a mobile terminal for a data transmission method according to an embodiment of the present disclosure. As shown in FIG. 1, a mobile terminal 10 may include one or more (only one is shown in FIG. 1) processors 102 (the processors 102 may include, but are not limited to, a processing apparatus such as a microcontroller unit (MCU) and a field programmable gate array (FPGA)), a memory 104 configured to store data, and a transmission apparatus 106 configured to implement a communication function. It should be understood by those skilled in the art that the structure shown in FIG. 1 is merely illustrative, and not intended to limit the structure of the electronic apparatus described above. For example, the mobile terminal 10 may further include more or fewer components than that shown in FIG. 1, or may have a configuration different from the configuration shown in FIG. 1.

The memory 104 may be configured to store software programs and modules of application software, such as program instructions/modules corresponding to the data transmission method in the embodiments of the present disclosure. The processors 102 execute the software programs and modules stored in the memory 104 to perform functional applications and data processing, that is, to implement the method described above. The memory 104 may include a high-speed random access memory, and may further include a nonvolatile memory, such as one or more magnetic storage apparatuses, flash memories or other non-volatile solid-state memories. In some examples, the memory 104 may further include memories that are remotely disposed with respect to the processors 102. These remote memories may be connected to the mobile terminal 10 via a network. Examples of the preceding network include, but are not limited to, the Internet, an intranet, a local area network, a mobile communication network and a combination thereof.

The transmission apparatus 106 is configured to receive or send data via a network. Specific examples of such a network described above may include a wireless network provided by a communication provider of the mobile terminal 10. In one example, the transmission apparatus 106 includes a network interface controller (NIC), which may be connected to other network devices via a base station, thereby communicating with the Internet. In one example, the transmission apparatus 106 may be a radio frequency (RF) module, which is configured to communicate with the Internet in a wireless way.

Figure 2:
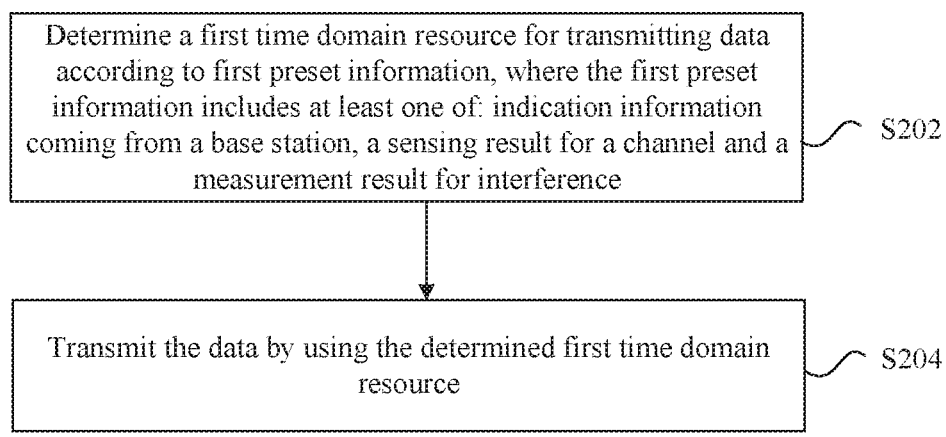
FIG. 2 is a method flowchart 1 according to an embodiment of the present disclosure.

The embodiment provides a data transmission method. FIG. 2 is a method flowchart 1 according to an embodiment of the present disclosure. As shown in FIG. 2, the method includes the steps described below.

In step S202, a first time domain resource for transmitting data is determined according to first preset information. The first preset information includes at least one of: indication information from a base station, a sensing result for a channel and a measurement result for interference.

In step S204, the data is transmitted by using the determined first time domain resource.

Through the above steps, since at least one piece of information (the indication information from the base station, the sensing result for the channel and the measurement result for the interference) determines the first time domain resource for transmitting the data according to the first preset information, a requirement of the interference and the traffic priority is considered, and the requirement for the transmission of the uplink and downlink traffic according to requirement adaption. Meanwhile, the problem that dynamic uplink and downlink data transmission cannot be transmitted according to traffic requirements in the existing art is solved, reducing the interference of data transmission, improving the probability of data transmission and ensuring the system performance.

Optionally, the above steps may, but may not necessarily, be executed by a terminal (such as a phone and a computer).

In the above embodiment, the sensing result for the channel refers to a sensing result of the terminal for the channel of the base station, and the measurement result for the interference also refers to a measurement result of the terminal for the interference of the base station.

The above embodiment uses ideas similar to multi-level dynamic DCI, and implements that dynamic TDD performs uplink and downlink dynamic configuration and resource scheduling adjustment at slot or mini-slot or symbol granularity according to traffic requirements.

In one optional embodiment, the first time domain resource includes a time domain start location and a time domain length. In this embodiment, the time domain start location and the time domain length of one data block-TB (corresponding to the above transport block) of data transmission are dynamically variable, and the first time domain resource may be continuous or discontinuous. For example, configuring the time domain start location of multiple candidate data transmissions or the time domain length (the time domain length includes 1/2/4/8/10 time units) of multiple candidate PUSCHs or physical downlink shared channels (PDSCHs) is determined according to the terminal capability and the traffic type. Then the dynamic time domain start location or time domain length of the eventually scheduled data transmission is determined according to at least one of: signaling indication; a sensing success moment; the measured interference level of the cross link. The method in which a transport block time domain may have different lengths satisfies the requirements of the transmission of data packets having different magnitude in different traffics. Meanwhile, the device may dynamically adjust the length of the transmission according to a specific condition of remaining resources, which improves the flexibility and efficiency of the data transmission.

In one optional embodiment, the time domain length includes: k time units, where k is a variable and an integer greater than or equal to 1; each of the k time units includes at least one of: a subframe, a slot, a mini-slot, an orthogonal frequency division multiplexing (OFDM) symbol.

In one optional embodiment, the indication information includes at least one of: a media access control control element (MAC CE); a radio resource control (RRC) message; dynamic downlink control information (DCI); configuration adjustment information for indicating uplink and downlink structures of the first time domain resource; information for indicating a candidate time domain location for sensing the channel; information for indicating a candidate time domain location for measuring the channel; information for indicating domain start locations of a plurality of pre-configured candidate first time domain resources; and parameter information for indicating a transmission of the data. In this embodiment, the first preset information is uplink and downlink configuration adjustment information related to resources, including uplink and downlink configuration adjustment information of a subframe and/or uplink and downlink configuration adjustment information of a slot.

In one optional embodiment, the parameter information includes at least one of: a number of slots for a data transmission, a number of mini-slots, a number of symbols, a modulation and coding scheme (MCS) indication, a frequency domain resource location, hybrid automatic repeat request (HARQ) process number information, transmission time domain location information of a cross link measurement signal, transmission start time domain location information, transmission end time domain location information, a beam indication or power control information; where the parameter information is determined through one piece of DCI or at least two pieces of DCI.

Optionally, the two pieces of DCI satisfies at least one of: the at least two pieces of DCI are located at different locations on a time domain; a first-level DCI (one DCI) in the at least two pieces of DCI includes at least one of: a carrier indication, resource allocation, pilot resource allocation, an MCS, a scheduling transmission timing, an acknowledgement (ACK) or non-acknowledgement (NACK) feedback timing, a number of scheduled slots, power control, a HARQ process number, a new data indication, a redundancy version, a beam index indication, precoding information, a channel state request indication, a trigger transmission indication for aperiodic sounding signal, and a sensing access priority; and a second-level DCI (another DCI) in the two pieces of DCI includes at least one of: an adjusted carrier indication, adjusted resource allocation, an adjusted MCS, scheduling transmission trigger indication information, an adjusted transmission timing, an adjusted ACK/NACK feedback timing, an adjusted number of slots, adjusted power control, an adjusted HARQ process number, an adjusted beam index. In this embodiment, in the at least two pieces of DCI, one DCI is the first-level DCI, another is the second-level DCI, the parameter information is determined through the first-level DCI and/or the second-level DCI. The above energy with a measurement level of RB or PRG of RBG is measured, interference intensity of each RB is fed back and the interference level is reported.

In one optional embodiment, the two pieces of DCI satisfies at least one of: the scheduling transmission timing of the first-level DCI is time domain offset information relative to a time domain location in which the second-level DCI is located; and adjusted information included in the second-level DCI is one piece of offset information based on the first-level DCI. The offset information includes at least one of: one piece of offset information of a frequency domain resource block (RB), one piece of offset information of a MCS and one piece of offset information of a transmission timing.

In one optional embodiment, a unit adjusted by the configuration adjustment information includes at least one of: a subframe, a slot, a mini-slot, and an orthogonal frequency division multiplexing (OFDM) symbol.

In one optional embodiment, the configuration adjustment information performs configuration adjustment on uplink and downlink structures of the first time domain resource through at least one of: providing uplink and downlink configuration structures of subsequent k subframes or slots by using the first-level DCI, informing slots for changing a frame structure by using the second-level UE-specific DCI or UE-group-specific DCI, where k is a variable and is an integer greater than or equal to 1; configuring one initial configuration by using DCI or a semi-static RRC message, and providing the uplink and downlink configuration structures of the slots through common DCI; providing the uplink and downlink configuration structures of the subsequent k subframes or slots by using the common DCI, in response to a change of the first time domain resource, obtaining changed information by an implicit mapping between a UL grant and a DL grant; and determining the uplink and downlink configuration structures by using a structure of a reference signal. In this embodiment, through the above configuration adjustment and corresponding scheduling adjustment, requirements of data traffic are met, and the performance of the data transmission system is ensured.

In one optional embodiment, when the indication information indicates the uplink and downlink structures of the first time domain resource change, the indication information includes: information for indicating a translation of the data, wherein the translation comprises: translating data of a time unit in a changed transmission direction, wherein a length of the translation is p codirectional time units, in response to encountering a time unit with a different transmission direction during the translation process, deferring the transmission backwards sequentially, wherein p is a variable and is an integer greater than or equal to 1.

In one optional embodiment, before determining the first time domain resource for transmitting the data according to the first preset information, the method further includes: sensing the channel through at least one of manners: detecting an energy or an interference intensity of the channel, where detecting the energy of the channel includes: detecting an energy on one resource group or one Physical Resource Block (PRB), and a statistical unit used in performing energy statistical calculation is one resource group or one PRB; detecting whether other devices at a network side transmit a cross link reference signal identifier on the channel, and determining whether a neighboring cell device performs reverse link data transmission on the channel according to a detection result of a reference signal. In this embodiment, the above sensing avoids interference of the data transmission to other neighboring cells, and ensures the performance of the data transmission.

In one optional embodiment, before determining the first time domain resource for transmitting the data according to the first preset information, the method further includes: measuring the interference through the following manner: determining a magnitude of cross link interference by measuring a specific signal, where the specific signal includes a sounding signal or a demodulation reference signal transmitted by other terminals.

In one optional embodiment, after determining the magnitude of cross link interference by measuring the specific signal, the method further includes: informing in a predefined time window, according to a pre-configured cycle, the base station of a determined interference measurement result in an ACK or NACK implicit manner, or in a reporting manner of the channel state information (CSI). In this embodiment, the ACK or NACK is transmitted by using an ACK or NACK message.

In one optional embodiment, before determining the first time domain resource for transmitting the data according to the first preset information, the method further includes: sensing the channel and/or measuring the interference through the following manner performing channel sensing and/or interference measuring from a first sensing location in a sequential order of pre-configured candidate sensing locations; where when the a sensing result of the channel sensing and/or the measure result of the interference measuring at a nth candidate sensing location is less than a preset threshold, determining a start location of the nth candidate sensing location as a location for starting data transmission, n=1, 2 ... m is a total number of locations configured for the channel sensing or the interference measuring, or a number of candidate time domain start locations for the data transmission; otherwise, determining a pre-configured uplink location as a location for the data transmission. The pre-configured location is predefined for transmitting uplink information, such as transmitting uplink control ACK or NACK information, channel state feedback information, and uplink data. In this embodiment, when a nth candidate location does not obtain the channel sensing and/or the measured interference measurement is greater than or equal to a preset threshold, a (n+1) candidate location performs the channel sensing and/or the interference measurement, where n=1, 2 ... m, m is a total number of locations configured for the channel sensing or the interference measuring, or a number of candidate time domain start locations for the data transmission.

In one optional embodiment, the method further includes: when a length of the first time domain resource dynamically changes, adjusting data transmission through at least one of manners: reperforming a rate matching according to an indicated MCS, where a value of the indicated MCS is a predetermined value or is an initial MCS value plus multiple offset values, and in response to determining that multiple indicated MCSs are provided, the multiple indicated MCSs are on a one-to-one correspondence with candidate sensing locations; converting a transport block size for transmitting the data, and adjusting the transport block size; and transmitting the data according to scheduling information corresponding to the changed length of the first time domain resource. In this embodiment, when the base station does not re-instruct the MCS, the UE encodes according to an originally indicated encoding mode, then performs a rate matching on the encoded data according to a new time-frequency resource, then modulates and maps the data according to the indicated modulation mode to the adjusted time-frequency resource.

In one optional embodiment, in response to a PUSCH starts transmitting from a qth scheduled slot, adjusting the transport block size includes one of: after converting a number of allocated RBs to ((the number of RBs)*a), obtaining an integer number of RBs after a converted value is rounded up or down, and searching a table to determine the transmission block size according to the integer number of RBs and a modulation coding indication parameter $I_{MCS}$ indicated by a scheduling signaling; after determining, via a table, an initial transport block size (TBS) through the number of RBs and $I_{MCS}$ indicated by the scheduling signaling, performing an operation of TBS*a on an initial TBS to obtain a temporary TBS, searching a TBS value closest to the temporary TBS from a TBS table, and taking the TBS value closest to the temporary TBS in the TBS table as a TBS transmitted on the PUSCH; keeping a code rate for transmitting the transport block unchanged, converting the TBS by a formula: (TBS+CRC)*a−CRC; searching a TBS closest to the converted TBS value from the TBS table as a TBS for transmitting the transport block, and performing encoding modulation according to $I_{MCS}$ indicated by the base station; where q is a variable and is an integer greater than or equal to 1; a=(m−f+1)/m, f is a variable and is an integer greater than or equal to 1, and m comprises at least one of: m is a total number of scheduled slots, each of m scheduled slots in a time domain are continuous or discrete, m is a total number of candidate locations configured for channel sensing or interference measurement, and m is a number of candidate time domain start locations for data transmission. CRC in the formula represents CRC of the data.

In one optional embodiment, in response to determining that a time domain location of the first time domain resource changes, a new time domain location is determined in front of a time domain location of an ACK or a NACK message fed back by a receiving end.

In one optional embodiment, in response to determining that a time domain length of the first time domain resource changes, a location of a demodulation reference signal of the data remains unchanged, where the location of the demodulation reference signal of the data is a predefined location.

In one optional embodiment, after receiving a message for indicating that the configuration adjustment information of the uplink and downlink structures of the first time domain resource changes, the method further includes: blindly detecting scheduling information of the base station within a predefined time, wherein the scheduling information is scrambled by a dedicated identifier, and the scheduling information is used for indicating that the data is rescheduled to one of the following locations: other time domain locations, other frequency domain locations, other carriers and other beams; in response to determining that the scheduling information fails to be detected within the predefined time, stopping transmission or reception of the data, or performing the transmission or reception of the data on a reserved resource.

Figure 3:
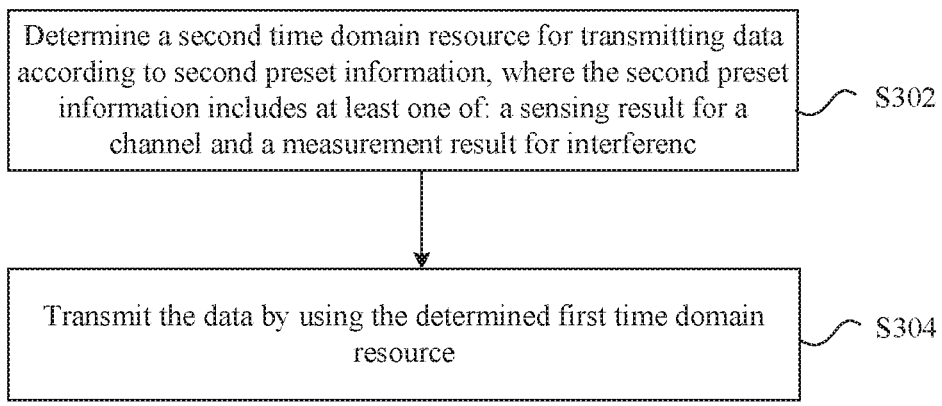
FIG. 3 is a method flowchart 2 according to an embodiment of the present disclosure.

The embodiment provides a data transmission method. FIG. 3 is a method flowchart 2 according to an embodiment of the present disclosure. As shown in FIG. 3, the method includes the steps described below.

In step S302, a second time domain resource for transmitting data is determined according to second preset information. The second preset information includes at least one of: a sensing result for a channel and a measurement result for interference.

In step S304, the data is transmitted by using the determined first time domain resource.

Through the above steps, since at least one piece of information (the sensing result for the channel and the measurement result for interference) determines the second time domain resource for transmitting the data according to the second preset information, the requirements of the interference and the traffic priority are considered, requirements transmitted according to requirement adaption of uplink and downlink traffics are satisfied, meanwhile, the problem of unable to implement dynamic uplink and downlink data transmission according to traffic requirements in the existing art is solved, reducing interference of data transmission, improving the probability of data transmission and ensuring the system performance.

Optionally, the above steps may, but may not necessarily, be executed by a network side (such as a base station).

In the above embodiment, the sensing result for the channel refers to a sensing result of the base station for the terminal of the base station, and the measurement result for the interference also refers to a measurement result of the base station for the interference of the terminal.

In one optional embodiment, the sensing result for the channel includes at least one of: obtaining the sensing result by sensing occupation information transmitted by a downlink channel indicated by a preset base station; and obtaining the sensing result by performing an energy measurement on a blank resource or a preset pattern.

In one optional embodiment, before determining the second time domain resource for transmitting data according to the second preset information, the method further includes measuring the inference through the following manner: performing interference measurement on a neighboring base station, and determining an interference of a link by measuring a cross link measurement signal, where the measurement signal includes at least one of: channel state information reference signal (CSI-RS), a demodulation reference signal (DMRS) and a discovery reference signal (DRS).

In one optional embodiment, the second preset information further includes: preset indication information, where the preset indication information includes at least one of: a number of uplink and downlink transmission slots, a number of mini-slots, a number of symbols, a modulation and coding scheme (MCS) indication, a frequency domain resource location, a hybrid automatic repeat request (HARQ) process number information, transmission time domain location information of a cross link measurement signal, candidate transmission star time domain location information, transmission end time domain location information, a beam indication, power control information, frame structure configuration information, adjusted uplink and downlink configuration information, and indication information adjusted by scheduling.

In one optional embodiment, the adjusted uplink and downlink configuration information is determined according to the sensing result for the channel and channel state information fed back by a terminal; and the indication information adjusted by scheduling is determined according to the sensing result for the channel and channel state information fed back by a terminal.

The present disclosure will be described in detail with reference to the specific embodiments.

Specific Embodiment One

The solution provided by the specific embodiment is as follows:

An idea similar to multi-level DCI is used to implement that the dynamic TDD performs uplink and downlink dynamic configuration and resource scheduling adjustment at slot or mini-slot or symbol granularity according to traffic requirements;

the problem of how to deal with the originally scheduled data, caused by dynamic TDD, involves the details such as indicating resource adjustment, transmission parameter adjustment and indication manners.

The magnitude of cross-link interference is determined and whether to start data transmission is determined by using a sensing or interference measurement method, and how to transmit data is determined when the data transmission start location is different.

To solve the above problem, embodiments of the present disclosure provide the solutions described below.

Figure 4A:
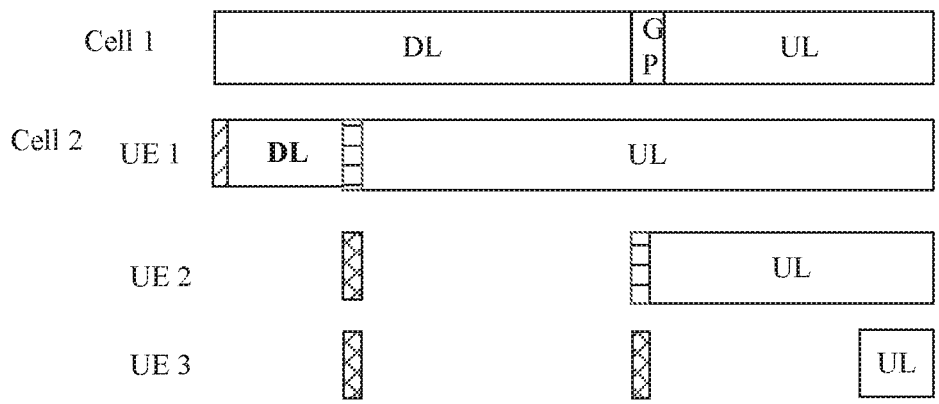
FIG. 4a is a schematic diagram 1 of dynamically adjusting uplink and downlink configuration and adjusting uplink and downlink scheduling according to an embodiment of the present disclosure.

The time domain start location and the time domain length of one transport block (TB) of data transmission are dynamically variable, and the time domain resource may be continuous or discontinuous. For example, the time domain start locations of multiple candidate data transmissions or the time domain length (the time domain length includes 1/2/4/8/10 time units, the time unit is one OFDM symbol or one mini-slot or one slot or one subframe) of multiple candidate PUSCHs or PDSCHs is configured, unit (in particular an OFDM symbol or a mini-slot or a slot or a subframe) that configures the time unit is configured according to the terminal capability and the traffic type. Then the dynamic time domain start location or time domain resource of the eventually scheduled data transmission is determined according to at least one of: 1) signaling indication; 2) a sensing success moment; 3) the measured interference level of the cross link. FIG. 4a is a schematic diagram 1 of dynamically adjusting uplink and downlink configuration and adjusting uplink and downlink scheduling according to an embodiment of the present disclosure. As shown in FIG. 4a, The uplink and downlink configuration of a cell 1 of two neighboring cells in a certain period of time is shown in FIG. 4a. This certain period of time is a subframe or a slot or multiple aggregated slots. Then the base station schedules three UEs with different geographical locations in the cell 2 to perform uplink data transmission on a certain uplink resource with the same transmission start location, and configures multiple candidate sensing locations or Gap locations or start transmission locations of the candidate PUSCH. After receiving the uplink scheduling information, the UEs perform channel sensing or cross link interference measurement before the first candidate start transmission location. These 3 UEs have different sensing/measurement results due to different geographical locations.

The UE1 performs sensing success or measures a low CLI before the first candidate data transmission or, then starts to transmit the scheduled TB from the first data transmission time domain location.

The UE2 first senses sensing failure or measures a high CLI due to cross link interference, and continues to the sense and measuring process before the second indicated candidate start transmission location, the UE2 senses sensing success or measures the low CLI, then starts to transmit the scheduled TB from the second PUSCH time domain location.

The UE3 senses sensing failure and measures high CLI at the first and second candidate sensing location, the UE3 waits to start uplink data transmission until a last predefined uplink location (or uplink alignment location). Here, the cell 1 is predefined for transmitting uplink control information, such as ACK/NACK, CSI, etc.

Figure 5:
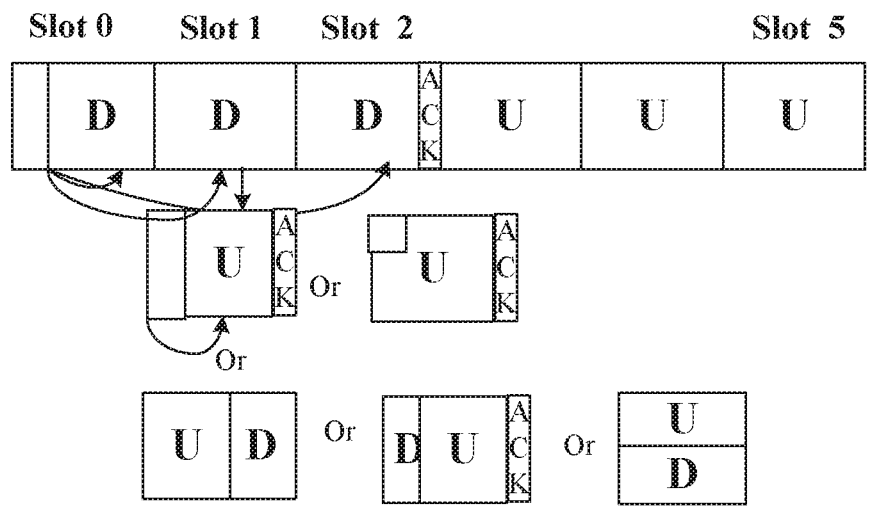
FIG. 5 is a schematic diagram of change of uplink and downlink configuration in one slot adjusted by scheduling.

4) the time domain resource location for scheduling TB transmission is determined according to the adjusted subframe or uplink and downlink configuration of the slot, and the time domain resource may be discontinuous. For example, to ensure transmission latency of uplink URLLC data, it is necessary to change slot configuration of a downlink slot 1 in which the TB configured to schedule from a slot0 to a slot2 for transmission is located. FIG. 5 is a schematic diagram of change of uplink and downlink configuration in one slot adjusted by scheduling. Specific configuration of the changed slot1 may be one of the five types in FIG. 5. The time domain resource location of the originally scheduled TB will change along with the uplink and downlink configuration information.

Furthermore, a method for determining the uplink and downlink configuration of the slot structure includes one of the following manners described below.

Manner one: the uplink and downlink configuration structures of the subsequent k subframes or slots are provided in a first-level common-DCI, and a second-level fast UE-specific DCI or UE-group-specific DCI (UEs scheduled in the same slot is in a group) notifies the slots changing the frame structure, and the slots without being notified is not changed.

Manner two: a slow DCI or semi-static RRC message is configured with a basic configuration. Configuration structure of each subframe or slot is provided in the fast common-DCI. The fast common-DCI is transmitted on each slot.

Manner three: the uplink and downlink slot configurations of the subsequent k subframes or slots are provided in the common-DCI, and the subsequent changed slot structure is obtained by the implicit mapping between the UL grant and the DL grant.

Manner four: the uplink and downlink configuration structures are determined by using a structure of a reference signal. For example, when the structure of the reference signal is a structure one or a set one, a corresponding slot or subframe is uplink, and when the structure of the reference signal is a structure two or a set two, the corresponding time slot or subframe is downlink.

The specific structure of the reference signal includes comb patterns with different frequency domains, OFDM symbols with different time domains, orthogonal codes with different code domains or different sequences.

Preferably, the scheduling information of the TB is determined by one DCI or by at least two levels of DCIs with different locations or two DCIs with different locations. The DCI information includes at least one of:

a number of slots/mini-slots, a number of symbols, a modulation and coding scheme (MCS) indication, a frequency domain resource location, a hybrid automatic repeat request (HARQ) process number information, transmission time domain location information of a cross link measurement signal, transmission start candidate time domain location information, transmission end time domain location information, a beam indication and power control information; and a candidate sensing location/blank resource.

When the UE does not receive the second DCI within a predefined time or a time configured by a higher layer, the data is transmitted or received according to the first DCI.

The second-level DCI may indicate a new transmission location of the data scheduled at an original time domain location, for example, a common DCI is transmitted to indicate that all UEs scheduled in a certain time period are shifted to the right by k time units according to a time axis, and the schedules defer backwards sequentially when encountering different transmission directions during shifting.

To avoid influence of retransmission, combination and the like, the new transmission location is indicated before the corresponding ACK/NACK feedback moment. When a receiving end feeds back the corresponding ACK/NACK, a feedback timing is counted from a TB end location.

Preferably, the method for scheduling TB transmission when the time domain length is dynamically changed includes at least one of the following manners described below.

Manner 1: the TBS is unchanged, the MCS of this TB corresponds to the time domain length. The scheduling information provides the start location of each candidate data transmission and the corresponding MCS. The MCS corresponding to the second time domain length may be provided by the offset of the MCS corresponding to the first time domain length.

Manner two: the TB size is dynamically adjusted according to the time domain length. The specific adjustment method adopts one of the following methods described below.

Method one: when the PUSCH/PDSCH is transmitted from a scheduled kth (k=1, 2 . . . m) slot, the TBS corresponding to PUSCH/PDSCH transmission is determined by scheduling signaling and an integer number of RBs which is obtained by rounding up or down according to a corresponding (m−k+1)/mth allocated PRB. m is the total number of the scheduled slots.

Method two: an initial TBS is determined according to indicated by the scheduling, then the TBS is performed with (m−k+1)/m operation and a temporary TBS is obtained, then a TBS value closest to the temporary TBS searched in the TBS table is taken as a final TBS transmitted by the PUSCH.

Method three: a transmission code rate remains unchanged. The conversion of ((TBS+CRC)*a−CRC) is performed on the TBS, where a=(m−k+1)/m, then the value of TBS closest to the converted TBS value is searched from the TBS table and is taken as the final TBS, and encoding modulation is performed according to the indicated MCS.

When the TB length or time domain resource is reduced due to adjusting uplink and downlink slot configuration, the transmission method of the TB further includes the methods described below.

Method one: a rate matching is reperformed on the whole TB according to the new time domain resource.

Method two: the rate matching is reperformed only on the slots changing the uplink and downlink configuration.

Furthermore, a sensing method of the device before data transmission includes sensing energy at each RB level and/or detecting the transmitted cross link reference signal identifier. When sensing the identifier, the device will know whether a neighboring cell performs reverse link data transmission.

The cross link measurement is to measure a measurement signal corresponding to a calling line identity (CLI), and calculate an interference matrix.

The CLI measurement signal for the UE is for measuring an SRS or DMRS measurement signal transmitted by surrounding UEs, and for measuring UL-to-DL interference or UE-to-UE interference intensity. The UE feeds back the measurement result to the base station to which the UE belongs in an ACK/NACK implicit manner or a CSI reporting manner. The base station adjusts uplink/downlink scheduling according to the measurement result, and at the same time, s the hidden node problem brought by avoiding interference through sensing before the base station transmits the downlink data is avoided. The base station measures the signal, similar to the CSI-RS, of the other base stations surrounded the base station, then adjusts the uplink scheduling, such as the scheduling of a RB resource or a beam direction, deferring scheduling, power control or the adjusting of the MCS, so as to avoid the hidden node problem brought by sensing when the terminal transmits the uplink.

Specific Embodiment Two

An uplink and downlink data transmission method in this specific embodiment is described below. A time domain length used for transmitting a data transport block is dynamically varied when a device transmits the data. The time domain length may be k OFDM symbols, n mini-slots or m slots. k, n and m are all positive integers greater than or equal to 1. Preferably, each time domain location carries different data of the transmission block.

A specific time domain length determination method includes at least one of the methods described below.

Method one: the time domain length is determined according to a signaling indication. The signaling includes a semi-static higher layer signaling, such as a RRC message, and dynamic DCI signaling, or the signaling may further include MAC CE.

A time domain length notification method includes at least one of: a base station semi-statically configures a candidate transport block time domain length set, such as {1, 2, 4, 8, 12, 14} OFDM symbols, through higher layer signaling, and then defines 3 bits in DCI to indicate the number of symbols or the time domain length of scheduled TB transmission. Or a candidate TB length configured by the higher layer signaling is {1, 2, 3, 4} slots, then 2 bits are provided in the dynamic DCI to indicate the time domain length of the specific scheduled data transmission.

The time domain length is directly notified through dynamic DCI when the scheduled TB transmits. For example, 3 bits are provided in DCI scheduling signaling shared by UE-specific or a UE group to indicate the number of mini-slots used for transmitting the scheduled data. A length of each mini-slot is predefined or semi-statically configured.

some candidate start time domain locations of the data transmission are configured by the higher layer signaling or DCI, the DCI provides a first location for transmitting the scheduled data and the number of scheduled time units, and then the device determines the time domain length according to the information.

Method two: the time domain length is determined according to a sensing result for the channel by the base station or a terminal.

For example, the base station schedules a certain UE to perform uplink data transmission in a slot4, and the slot4 includes 14 symbols. Meanwhile, three candidate Gaps or blank areas in the slot4, a length of each of the three candidate Gaps or blank areas is about m microseconds. The terminal may perform interference measurement from the channel or monitor energy of a signal on the channel at the locations of the three candidate Gaps or blank areas. These three locations are respectively a start/end of a first symbol, a start/end of a fourth symbol, and a start/end of an eighth symbol. Then the terminal determines the final start location and the time domain length of the data transmission according to the sensing result of the channel. An end location is the end of the scheduled slot.

Method 3: the time domain length of the transmission is determined according to an uplink and downlink subframe configuration adjustment.

For example, the base station initially configures slots 2 to 5 of a certain cell to be uplink slots for scheduling uplink eMBB data transmission, due to the requirement of the downlink high priority traffic, the slot4 is adjusted to be the downlink slot for transmitting the downlink high priority data, such as some ultra-reliable low latency communication (URLLC) traffics. Then at this time, the time domain length of the uplink data transmission is reduced by one slot from the original four slots to three slots.

Method 4: the time domain length is determined according to the measured interference level.

Method 5: the time domain length is determined according to a traffic type.

It is to be noted that the above methods may be combined for used, for example, a transmission mode for uplink transport block may be:

the base station configures several candidate sensing locations and provides MCSs and frequency domain resource locations for the data transmission corresponding to the candidate sensing locations.

The terminal firstly senses at a first candidate time domain location, and if the energy on the channel is measured to be larger than a predefined threshold, the terminal continues to sense at a second candidate time domain location.

If the terminal senses success, then the scheduled time domain length is transmitted continuously. Meanwhile, when the UE receives that attributes of the subframe for transmitting the time domain location indicated by secondary indication information change, the UE punctures data, i.e., discard the data transmitted on the time domain location, on this time domain location.

In summary, a transport block time domain may have different methods for determining the time domain length, which satisfies the requirements of the transmission of data packets having different magnitude in different traffics. Meantime, the device may dynamically adjust the transmission length according to the specific conditions of the remaining resources, improving the flexibility and data transmission efficiency.

Specific Embodiment Three

This specific embodiment illustrates the involved physical layer signalings. The physical layer signalings includes signaling for informing a terminal of uplink and downlink frame structure configuration and signaling for a scheduling update indication.

Attribute configuration for indicating uplink and downlink of the terminal specifically includes the modes described below.

Manner one: the uplink and downlink slot configuration of subsequent k subframes or slots are provided in a first-level common-DCI, and a second-level fast UE-specific DCI or UE-group-specific DCI (UEs scheduled in a same slot is in a group) notifies the slots changing the attribute or structure, and the slots without being notified is not changed.

The fast DCI refers to the DCI which has a higher frequency than the other DCI and is closer to the time domain location of the data transmission, for example the fast DCI occurs at each slot.

Manner two: a slow DCI or a semi-static RRC message is configured with a basic configuration. Configuration of each subframe or slot is provided in the fast common-DCI.

Manner three: the uplink and downlink configurations of the subsequent k subframes or slots are provided in the common-DCI, and the changed configuration is obtained by the implicit mapping between the UL grant and the DL grant. For example, common DCI information is transmitted at a slot0 in a bitmap manner to indicate that the uplink and downlink configuration from the slot0 to slot9 are 1111110000, i.e., the first six slots are configured to be downlink slots and the last 4 slots are configured to be uplink slots. Then the UE needs to blindly detect DCI information of the UE itself in the configured downlink slots, if the UE blindly detect, at the slot1, a UL grant which is used for indicating that the scheduled uplink data is transmitted at a slot5, it is considered that the slot5 which is configured to be a downlink slot is adjusted to be an uplink slot to transmit the uplink data. If the UE blindly detects, at the slot4, the DL grant, the downlink data is scheduled to transmit at slot9, it is considered that the slot9 originally configured to be the uplink slot is adjusted to be a downlink slot. For slots having no DL grant or UL grant blindly detected, the UE considers that the originally configured uplink and downlink structures are not changed.

In addition to the uplink and downlink configuration indication information, for the UE originally scheduled in a slot k, the base station may transmit a second-level DCI to notify a new transmission location slot m of the changed scheduled data.

For example, when the channel state from the slot k to the slot m is measured unchanged, the second-level DCI only includes new time domain location indication information. For example, 2 bits are defined to indicate offset information of a new location relative to the original location. The offset information may be UE-specific DCI, or DCI shared by multiple UEs scheduled at a same moment, or DCI which is common and is shared by all UEs. If the offset information is the common DCI, the scheduled UEs move by an offset in a whole, and during the translation, if a slot in a different transmission direction is encountered, the slots is sequentially deferred.

Figure 4B:
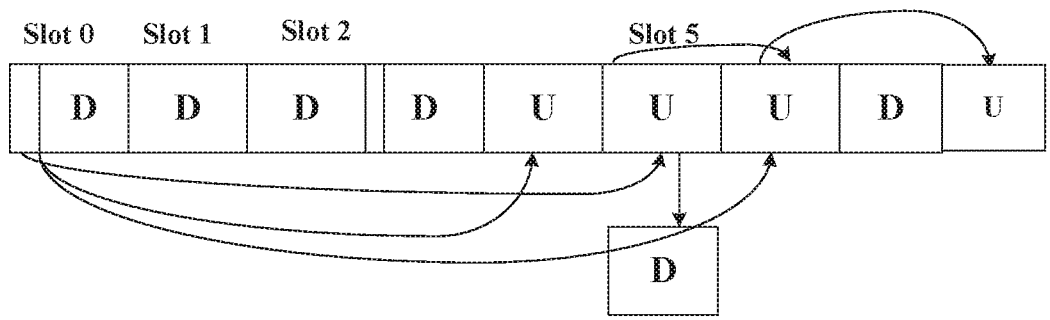
FIG. 4b is a schematic diagram 2 of dynamically adjusting uplink and downlink configuration and adjusting uplink and downlink scheduling according to an embodiment of the present disclosure.

FIG. 4b is a schematic diagram 2 of dynamically adjusting uplink and downlink configuration and adjusting uplink and downlink scheduling according to an embodiment of the present disclosure. As shown in FIG. 4b, the base station transmits one piece of scheduling information at the slot0, one UE is scheduled to transmit data at the slots 4, 5 and 6. Due to downlink traffic requirements, the base station adjusts the slot5 to the downlink slot and transmits one piece of control information at the same time, for example, 01 indicates to shift one slot, and indicates that uplink data, which is scheduled to transmit in the slot5, is shifted to transmit at the slot6, data of the slot6 is shifted to a next uplink slot8 to be transmitted. The base station only transmits one piece of UE group scheduling update information to the UE originally scheduled in slot5, and adjusts data of the slot5 to a slot which is not allocated or scheduled for data transmission. When a change amount of the channel state in a process of dynamically changing the uplink and downlink configuration exceeds a predefined threshold, the base station further needs to indicate information such as a new MCS and a codebook in addition to giving new time domain location information in the scheduling adjustment process.

Through the above configuration adjustment and corresponding scheduling adjustment, traffic requirements are met, and the system performance is ensured.

Specific Embodiment Four

This specific embodiment illustrates that a data transmission structure changes under dynamic TDD and how to transmit original uplink data after the change.

For example, an uplink TB is initially scheduled to be transmitted at multiple aggregated slots, then a certain mini-slot in a certain slot during the transmission are dynamically adjusted to be downlink transmission URLLC due to traffic requirements, then how to adjust and process the TB transmission is described below.

As shown in FIG. 5, it is assumed that a DCI schedules an uplink TB to perform the data transmission on three consecutive uplink slots or mini-slots at the time that the base station initializes the slot0. Then if a URLLC data packet needs to be transmitted on the downlink, before transmitting the uplink data, such as a common second-level DCI at the slot3, the base station indicates that first two 01-DM symbols in the slot5 is used for transmitting the downlink URLLC data packet, then the remaining 5 symbols of the slot5 is still used for the uplink data transmission. The DCI information may further be UE-group-specific, i.e., scheduling update indication information is only transmitted to the UE scheduled at the slot.

The scheduling update indication information further includes at least one of: an MCS, a PRB location and an uplink and downlink structure after the slot changes. For example, since transmission resources of the scheduled data reduce, the base station may allocate a higher MCS coding rate than the original one. Or the UE is reallocated with more frequency domain PRB resources.

After receiving the indication information, the UE adjusts the data transmission by one of methods described below.

Method one: the UE re-converts and determines a new TBS according to the indication information.

The specific conversion method adopts one of the methods described below.

Alt1: a PRB is converted to a corresponding scale when the TBS is searched. For example, two symbols in an uplink slot including 7 symbols are adjusted to transmit downlink URLLC data packet, in this case, when the scheduled UE determines the transmitted TBS, the number of the allocated PRB which is assumed to be 7 is multiplied by a factor of 5/7 and to obtain 5. Then when searching a TBS table, the scheduled UE determines a final TBS for the data transmission according to PRB=5 and an allocated MCS index.

Alt2: firstly, an initial TBS is determined according to the TBS table, then the TBS is converted to the corresponding scale.

Method two: the UE reperforms a rate matching according to new resources.

When the base station does not re-instruct the MCS, the UE encodes data according to an originally indicated encoding mode, then performs the rate matching on the encoded data according to a new time-frequency resource, then modulates and maps the encoded data according to the indicated modulation mode to the adjusted time-frequency resource.

When the base station indicates the MCS corresponding to the adjusted resource, then the UE performs encoding adjustment according to the indicated MCS.

Method 3: the rate matching is only performed on data of the slot, and data of other slots is unchanged.

For example, after changing two symbols of the 14 symbols in one slot originally used for uplink transmission to downlink transmission, the terminal may reperform the rate matching only on the data transmitted by the slot, and the data transmitted by other slots is unchanged.

Method 4: the UE punctures data of this location.

For the UE, the method 4 is the simplest to implement and does not require signaling overhead. That is, before the data transmission, the UE punctures the data intending to be transmitted at a resource k, i.e., the data is not transmitted any more. Spare of the resource location k is used for adjusting downlink traffic transmission, ensuring the downlink data performance.

Specific Embodiment Five

This specific embodiment illustrates that a data transmission structure changes under dynamic TDD and how to transmit original downlink data after the change.

A downlink TB is initially scheduled to be transmitted at multiple slots, then a certain or some aggregated mini-slots in one slot during the transmission are dynamically adjusted to be uplink transmission URLLC due to traffic requirements, how a base station adjusts a structure of the slot is described below.

Method: the structure of the slot is modified to a structure of a mixed self-containment slot.

As shown in FIG. 5, the specific structure of the mixed self-containment slot may be: slots for the original downlink data transmission is divided into three parts, which are time division or frequency division, a first part is used for transmitting downlink control information, a second part is used for transmitting an uplink URL traffic, and a third part is used for transmitting ACK/NACK. DCI of the slot indicates the structure of the self-containment slot. Or only a part of the slot is used for uplink URLLC data transmission, and a part of the slot is used for original downlink scheduled data transmission. The two parts may be time division or frequency division. Meanwhile, remaining data are performed a rate matching.

The indication is only able to be transmitted before the change. The change may be indicated during the downlink data transmission. As shown in FIG. 5, The UE determines a location of a punctured downlink enhanced mobile broadband (eMBB) through the indicated URLLC resource location.

In a data receiving process, if the UE detects that a downlink data packet indicated by common control information is destroyed, then the UE does not need to demodulate the data at this location when demodulating.

The base station retransmits the punctured eMBB before the UE feeds back the ACK/NACK, and then the UE combines the retransmitted data with the initially transmitted data to demodulate the data and feedback the ACK/NACK.

Specific Embodiment Six

The specific embodiment illustrates that data transmission is determined by a method for uplink sensing before the data transmission in detail.

A cell 2 continuously schedules an eMBB TB of UE to transmit at four uplink aggregated slots or mini-slots, and the UE senses before the data transmission to eliminate an interference problem brought by a cross link.

Method one: a code rate is adjusted according to a remaining time domain resource, and a TBS is unchanged.

Indication of multiple offsets of the basic MCS of the candidate sensing locations (which may be indicated by a bitmap corresponding to a scheduled slot) are provided in the DCI. The offset indication and the candidate sensing location are corresponding.

For example, 1010 may indicate that the sensing is performed at the start location of the first slot and the stat location of the third slot, and a MCS corresponding to the first aggregated slot is a MCS1 when the sensing is successfully performed, and a MCS corresponding to successful data transmission at the second sensing location is a MCS2.

A first sensing is failure since cross link interference exists, then the UE reperforms link adaptation according to the new MCS, and prepares to sense continuously at a second indicated sensing location. And if the second sensing is success, the TB is transmitted according to the MCS2. If the sensing still fails at a last candidate sensing location, then the transmission may only be abandoned.

Or the UE waits until a last predefined uplink location (uplink alignment location) to start the data transmission.

The base station performs a blind detection and reception at an indicated start location for the data transmission.

Method 2:

The UE adjusts the TBS according to the number of remaining slots after sensing the idle.

A specific TBS determination method is described below.

Manner one: when a PUSCH is transmitted from a scheduled kth (k=1, 2 . . . m) slot, a TBS corresponding to the PUSCH transmission is determined by scheduling signaling and an integer number of RBs which is obtained by rounding up or down according to a corresponding (m−k+1)/mth allocated PRB.

m is the total number of the scheduled slots.

For example, when a UL grant schedules data of a terminal to transmit from a slot 1 to a slot 4, a number of the provided RBs is 8, and $I_{MCS}$ is 4, the terminal starts to sense that an inference intensity and channel energy is less than a predefined threshold at a slot 3, therefore, the terminal searches a TBS determination table to obtain the TBS transmitted by the PUSCH when determining the transmitted transport block according to $I_{TBS}$=4 and $N_{PRB}$=4. That is, frequency domain resources are scaled down according to a time domain length and then the TBS is determined.

Manner two: a (m−k+1)/m operation is performed according to the number of allocated RBs and the determined TBS to obtain a temporary TBS, then a TBS value closest to the temporary TBS searched from the TBS table is taken as a final TBS transmitted by the PUSCH. That is, the TBS is determined according to the number of indicated RBs and MCS information, then corresponding transformation is performed on the TBS according to a time domain length scaled down ratio. m is the total number of the scheduled slots.

Manner three: a transmission code rate keeps unchanged.

Conversion of (TBS+CRC)*a−CRC is performed on the TBS, where a=(m−k+1)/m, then the TBS value closest to the converted TBS value is searched from the TBS table and is taken as the final TBS, and encoding modulation is performed according to the indicated MCS. m is the total number of the scheduled slots.

The base station of a receiving end receives the data according to this preset conversion rule.

Specific Embodiment Seven

The specific embodiment illustrates that data transmission is determined by a data transmission method for downlink sensing before the data transmission in detail.

Scheduling process of downlink data is considered in combination with two levels of DCI.

First, a base station notifies the base station of a candidate sensing location or a candidate downlink data start location and corresponding MCS information in a first-level common DCI.

Figure 6:
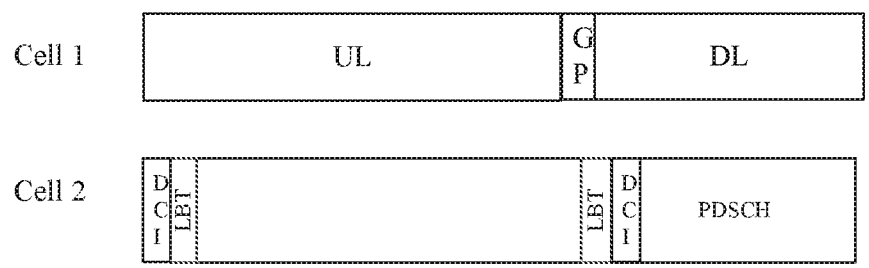
FIG. 6 is a schematic diagram of transmitting downlink data by a base station.

FIG. 6 is a schematic diagram of transmitting downlink data by a base station. As shown in FIG. 6, in the neighboring two cells, the cell 1 performs the data transmission according to uplink and downlink configuration in FIG. 6. The base station of the cell 2 firstly senses at a first sensing location before transmitting the downlink data, and since a neighboring cell transmits uplink data at this time, the base station senses that the interference is relatively strong, that is, cross link interference exists. Then the base station defers to a next candidate sensing location shown in FIG. 6 to re-sense the channel. Since the neighboring cell is transmitting the downlink data at this time, energy measured on the channel by the base station is relatively small, and the data transmission is in a same link direction. Therefore, the base station senses success and transmits the downlink data.

If the base station adjusts scheduling information such as MCS, TBS, or PRB according to the sensing result and notifies UE of the adjusted information through a second-level DCI, the DCI is DCI specific to schedule the UE. For example, if the base station does not sense successfully at the first sensing location or detects that the cross link interference is relatively strong, then the base station will transmit MCS updating information corresponding to an original second candidate transmission location while sensing a better channel condition at a second sensing location.

The UE performs a data blind detection and reception at the candidate data start location according to the common DCI. If the two-level DCI is blindly detected at the candidate start location, the terminal receives the downlink data according to the DCI; otherwise, the terminal receives the downlink data according to the originally scheduled DCI.

Specific Embodiment Eight

This specific embodiment illustrates HARQ processing or ACK/NACK feedback corresponding to a data packet.

When a transport block is mapped onto multiple time units for data transmission and a timing relationship of ACK/NACK feedback is a semi-statically configured or signaling indicated value, an ACK/NACK timing location fedback by a receiving end should be calculated from a time unit last transmitted by the transport block. For example, the base station schedules a downlink data transport block to transmit from a slot4 to a slot7, then the base station simultaneously indicates that a feedback timing of the ACK/NACK corresponding to the data block is 4 time units, and the terminal feeds back the data block after receiving the data block. A location of the ACK/NACK corresponding to transport block after a terminal receives the data block is a location of a slot which is four slots backwards the slot 7. If the slot is an uplink or mixed slot structure, then the terminal may feedback ACK/NACK at the slot. When the slot is a downlink slot, the UE defers backwards to a nearest uplink slot or mixed slot to transmit ACK/NACK.

When the base station indicates a transmission time domain location of a new data packet through a second-level DCI, and no new ACK/NACK feedback time domain location is provided, then the timing relationship is determined according to the new transmission time domain location. If the base station indicates that the ACK/NACK feedback timing corresponding to the data block is 4 time units, at the same time, before the transmission, the new data transmission time domain location is adjusted, for example the location is changed from an original slot 2 to the slot 4, then the terminal should feedback the ACK/NACK according to the location which is 4th slots right of the slot4. However, if the location is a downlink slot and no uplink area to transmit the ACK/NACK, a time domain location feeding back the ACK/NACK is sequentially deferred backwards unit an uplink area in a closest uplink slot or a mixed slot transmits the ACK/NACK. When the location feeding back the ACK/NACK is a dynamic DCI indication instead of being determined by a timing relationship, a new time domain location for adjusting the data transmission location should be before a moment for feeding back the ACK/NACK by the terminal. For retransmitting the data packet, the terminal combines and demodulates the retransmission packet and the initial transmission packet according to the new indication information, and then feeds back the ACK/NACK.

The ACK/NACK information further carries the cross link interference result of the terminal to the channel, i.e., measurement feedback information is reported to the base station in ACK/NACK implicitly mapping manner. If the base station is able to transmit scheduling indication information reported by aperiodic CSI during this period, the information is transmitted by resources scheduled by the base station, otherwise, the terminal reports the measured interference result of the cross link to the base station in the fed back ACK/NACK implicit manner. For example, ACK represents that the interference is strong or exceeds the threshold, and NACK represents that the interference is small or does not exceed the threshold. Then the base station performs uplink and downlink adjustment on the scheduling data based on the feedback information. When the terminal reports that the interference is strong, the base station may configure the closest slot as the downlink, and transmit the downlink data to UEs at other geographical locations or schedule the UEs at other geographical locations to transmit the uplink data. When the terminal reports that the interference is small, the base station may immediately schedule the UEs at the geographical location to transmit the uplink data or transmit the downlink data to these UEs.

Specific Embodiment Nine

This specific embodiment illustrates a method for measuring a measurement signal.

For downlink data transmission, since UE-to-UE interference/UL-to-DL interference exists, a UE-to-UE interference measurement needs to be performed. In this case, a terminal needs to transmit the measurement signal for measuring cross link interference. For example, UE transmits a sounding signal, such as SRS or DMRS. The reference signal is generated by a ZC sequence.

The measurement signal is a periodic signal, and a specific period is configured by a higher layer semi-static signaling of the base station. But the transmission of the measurement signal or not may be triggered by base station DCI or other means. The transmission of the signal may be a predefined time window. When the base station at this location is configured for downlink, the transmission needs to be delayed.

An interference measurement signal of UE-to-UE in the frequency domain may be one of the following:

case one: cross link measurement signals transmitted by all the UEs are transmitted by a large bandwidth, and multiplexing is performed among different UEs in a frequency-division multiplexing (FDM) or code division multiplexing (CDM) manner or different comb;

case two: the UEs with a same geographic location are grouped into a group, then different location frequency domains or measurement patterns transmitted by interference measurement signals of different UEs are configured and interference of different frequency domain locations is reported.

An energy with a measurement level of RB or PRG of RBG is measured, interference intensity of each RB is fed back and the interference level is reported.

Specific Embodiment Ten

This specific embodiment illustrates a sensing method.

A transmitting end may firstly sense before data transmission to avoid a cross link interference problem occurring during the data transmission. The sensing includes at least one of the manners described below.

Manner 1: measuring energy of a signal on a channel transmitting data. The inference magnitude is determined through energy. When the measured energy reaches a pre-defined threshold, it is considered that the link direction of the neighboring cell is different from the cell itself, the data transmission is delayed, and before the data transmission, the sensing is still needed, or the data is transmitted by a reduced power.

Manner two: whether a reference signal in a reverse link on the channel occurs is detected. For example, DMRSs are divided into two orthogonal sets, one orthogonal set is used for uplink and another orthogonal set is used for downlink. And the DMRSs are transmitted on a symbol preceding the data. An orthogonal mode may be frequency division or code division. The code division may be OCC or through different cyclic shift.

The sensing method avoids interference of data transmission to other neighboring cells, and ensures the data transmission performance.

Specific Embodiment Eleven

This specific embodiment illustrates another manner for sharing resource between two cells.

When a distance between the two cells is within a predefined range, the two cells may share a frequency domain resource in a frequency division multiplexing manner. The frequency domain unit for frequency division is a RB or a subband or an interleaved unit, or a predefined frequency domain resource. The frequency domain resource or frequency domain resource pattern for data transmission is different at a certain time in different cells.

For example, indexes of frequency domain RBs or interleaving units used by a cell 1 are 0, 3, 6, 9, 12, and 15, and indexes of RBs or interleaving units used by a cell 2 in a same system bandwidth and a same time resource are 1, 4, 7, 10, 13, and 16. Alternatively, the system bandwidth is directly divided into two parts, the frequency domain resource of each part is continuous, the first cell uses a first part and the second part uses a second part.

The frequency domain resource is semi-statically determined in a coordination manner between base stations. Then each base station adaptively changes uplink and downlink structures of the frequency domain resource according to an uplink and downlink traffic load of the cell, when a distance between two cells is smaller than a predefined threshold, frequency domain resources of the two cells is non-adjacent, i.e., a guard band is provided between the frequency domain resources of the two cells. The guard band may be m sub-carriers in magnitude.

In conclusion, this frequency division multiplexing manner avoids the interference problem caused by two cells simultaneously using the same frequency domain resources.

The base station described in the present disclosure includes a Node B, an evolved base station (eNode B), a home Node B, a relay node (RN), a macro base station, a micro base station, and the like. The data transmission method provided in the above embodiment may on one hand implement a dynamic adaptive frame structure configuration adjustment of according to uplink and downlink loads, and on the other hand, avoid cross link interference, meanwhile, a corresponding solving method is provided for the data scheduling and data transmission, ensuring the data transmission system performance.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

The embodiment further provides a data transmission device. The device is configured to implement the above-mentioned embodiments. What has been described will not be repeated. As used below, a term "module" may be software, hardware or a combination thereof capable of implementing predetermined functions. The device in the embodiment described below is preferably implemented by software, but implementation by hardware or by a combination of software and hardware is also possible and conceived.

Figure 7:
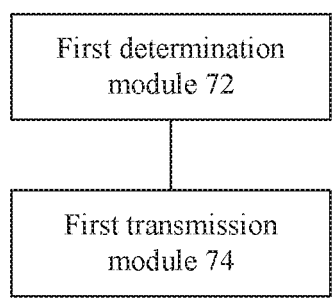
FIG. 7 is a block diagram 1 of a data transmission device according to an embodiment of the present disclosure.

FIG. 7 is a block diagram 1 of a data transmission device according to an embodiment of the present disclosure. As shown in FIG. 7, the device includes a first determining module 72 and a first transmission module 74 and the device is described below.

The first determination module 72 is configured to determine a first time domain resource for transmitting data according to first preset information, where the first preset information includes at least one of: indication information from a base station, a sensing result for a channel and a measurement result for interference; and the first transmission module 74 is connected to the first determination module 72 and is configured to transmit the data by using the determined first time domain resource.

In one optional embodiment, the first time domain resource includes a time domain start location and a time domain length.

In one optional embodiment, the time domain length includes: k time units, where k is a variable and an integer greater than or equal to 1; each time unit includes at least one of: a subframe, a slot, a mini-slot, and an orthogonal frequency division multiplexing (OFDM) symbol.

In one optional embodiment, the indication information includes at least one of: media access control control element (MAC CE); a radio resource control (RRC) message; dynamic downlink control information (DCI); configuration adjustment information for indicating uplink and downlink structures of the first time domain resource; information for indicating a candidate time domain location for sensing the channel; information for indicating a candidate time domain location for measuring the channel; information for indicating domain start locations of a plurality of pre-configured candidate first time domain resources; and parameter information for indicating a transmission of the data.

In one optional embodiment, the parameter information includes at least one of: a number of slots for the data transmission, a number of mini-slots, a number of symbols, a modulation and coding scheme (MCS) indication, a frequency domain resource location, a hybrid automatic repeat request (HARQ) process number information, transmission time domain location information of a cross link measurement signal, transmission start time domain location information, transmission end time domain location information, a beam indication, and power control information; where the parameter information is determined through one piece of DCI or at least two pieces of DCI.

Optionally, the two pieces of DCI satisfies at least one of: the two pieces of DCI have different time domain locations; first-level DCI in the two pieces of DCI comprises at least one of: a carrier indication, resource allocation, pilot resource allocation, an MCS, a scheduling transmission timing, an acknowledgement (ACK) or non-acknowledgement (NACK) feedback timing, a number of scheduled slots, power control, a HARQ process number, a new data indication, a redundancy version, a beam index indication, precoding information, a channel state request indication, a trigger transmission indication for aperiodic sounding signal, and a sensing access priority; and a second-level DCI in the two pieces of DCI comprises at least one of: an adjusted carrier indication, adjusted resource allocation, an adjusted MCS, scheduling transmission trigger indication information, an adjusted transmission timing, an adjusted ACK/NACK feedback timing, an adjusted number of slots, adjusted power control, an adjusted HARQ process number, an adjusted beam index.

In one optional embodiment, the two pieces of DCI satisfies at least one of: the scheduling transmission timing of the first-level DCI is time domain offset information relative to a time domain location in which the second-level DCI is located; and adjusted information included in the second-level DCI is one piece of offset information based on the first-level DCI.

In one optional embodiment, a unit adjusted by the configuration adjustment information includes at least one of: a subframe, a slot, a mini-slot, and an orthogonal frequency division multiplexing (OFDM) symbol.

In one optional embodiment, the configuration adjustment information performs configuration adjustment on uplink and downlink structures of the first time domain resource through at least one of: providing uplink and downlink configuration structures of subsequent k subframes or slots by using the first-level DCI, informing slots for changing a frame structure by using second-level user equipment specific (UE-specific) DCI or UE-group-specific DCI, wherein k is a variable and is an integer greater than or equal to 1; configuring one initial configuration by using DCI or a semi-static RRC message, and providing the uplink and downlink configuration structures of the slots through common DCI; providing the uplink and downlink configuration structures of the subsequent k subframes or slots by using the common DCI, in response to a change of the first time domain resource, obtaining changed information by an implicit mapping between an uplink (UL) grant and a downlink (DL) grant; and determining the uplink and downlink configuration structures by using a structure of a reference signal.

In one optional embodiment, when the indication information indicates the uplink and downlink configuration structures of the first time domain resource change, the indication information includes: information for indicating a translation of the data, wherein the translation comprises: translating data of a time unit in a changed transmission direction, wherein a length of the translation is p codirectional time units, in response to encountering a time unit with a different transmission direction during the translation process, deferring the transmission backwards sequentially, wherein p is a variable and is an integer greater than or equal to 1.

In one optional embodiment, the device further includes a first processing module, which is configured to before determining the first time domain resource for transmitting the data according to the first preset information, sense the channel through at least one of manners: detecting an energy or an interference intensity of the channel, wherein detecting the energy of the channel comprises: detecting an energy on one resource group or one Physical Resource Block (PRB), and a statistical unit used in performing energy statistical calculation is one resource group or one PRB; and detecting whether other devices at a network side transmit a cross link reference signal identifier on the channel, and determining whether a neighboring cell device performs reverse link data transmission on the channel according to a detection result of a reference signal. In one optional embodiment, the device further includes a second processing module, which is configured to before determining the first time domain resource for transmitting the data according to the first preset information, measure the interference through the following manner: determining a magnitude of cross link interference by measuring a specific signal, where the specific signal includes a sounding signal or a demodulation reference signal transmitted by other terminals.

In one optional embodiment, the device further includes a third processing module, which is configured to after determining the magnitude of cross link interference by measuring the specific signal, inform in a predefined time window, according to a pre-configured cycle, the base station of a determined interference measurement result in an ACK or NACK implicit manner, or in a reporting manner of the channel state information (CSI).

In one optional embodiment, the device further includes a fourth processing module, which is configured to before determining the first time domain resource for transmitting the data according to the first preset information, sense the channel and/or measuring the interference through the following manner: performing channel sensing and/or interference measuring from a first sensing location in a sequential order of pre-configured candidate sensing locations; where in response to determining that a sensing result of the channel sensing and/or a measure result of the interference measuring at a nth candidate sensing location is less than a preset threshold, determining a start location of the nth candidate sensing location as a location for starting data transmission, where n=1, 2 . . . m, m is a total number of locations configured for the channel sensing or the interference measuring, or a number of candidate time domain start locations for the data transmission; otherwise, determining a pre-configured uplink location as a location for the data transmission.

In one optional embodiment, the device further includes at least one of: a third transmission module, which is configured to when a length of the first time domain resource dynamically changes, reperform a rate matching according to an indicated MCS, where a value of the indicated MCS is a preset value or is an initial MCS value plus a plurality of offset values, and in response to determining that a plurality of indicated MCSs are provided, the plurality of indicated MCSs are on a one-to-one correspondence with candidate sensing locations; an adjustment module, which is configured to when the length of the first time domain resource dynamically changes, converting a transport block size for transmitting the data, and adjusting the transport block size, and a fourth transmission module, which is configured to when the length of the first time domain resource dynamically changes, transmit the data according to scheduling information corresponding to the changed length of the first time domain resource.

In one optional embodiment, the adjusting the transport block size includes one of: when a PUSCH starts transmitting from a qth (k=1, 2 ... m) scheduled slot, determining TBS of the transport block corresponding to PUSCH transmission according to an integer number of RBs and modulation coding indication parameter $I_{MCS}$ indicated by scheduling signaling obtained by rounding up or down (m−q+1)/mth RB, where m is a total number of locations configured for the channel sensing or the interference measuring, or a number of candidate time domain start locations for the data transmission; where q is a variable and is an integer greater than or equal to 1; determining the number of RBs indicated by the scheduling signaling and an initial TBS, performing operation of (m−r+1)/m on the initial TB S obtain a temporary TBS, searching a TB S value closest to the temporary TBS from a TBS table, and taking the TBS value closest to the temporary TBS in the TBS table as a TBS transmitted by the PUSCH; where r is a variable and is an integer greater than or equal to 1; keeping a code rate for transmitting the transport block unchanged, converting the TBS by a formula: (TBS+CRC)*a−CRC; where a=(m−f+1)/m, searching a TBS closest to the converted TBS value from the TBS table as a TBS for transmitting the transport block, and performing encoding modulation according to $I_{MCS}$ indicated by the base station; m is a total number of scheduled slots, each of m scheduled slots in a time domain are continuous or discrete, where f is a variable and is an integer greater than or equal to 1, CRC in the formula represents CRC of the data.

In one optional embodiment, when a time domain location of the first time domain resource changes, a new time domain location is determined in front of a time domain location of an ACK or a NACK message fed back by a receiving end.

In one optional embodiment, when a time domain length of the first time domain resource changes, a location of a demodulation reference signal of the data remains unchanged, where the location of the demodulation reference signal of the data is a predefined location.

In one optional embodiment, the device further includes:
a blind detection module, which is configured to after receiving a message for indicating that the configuration adjustment information of the uplink and downlink structures of the first time domain resource changes, blindly detect scheduling information of the base station within a predefined time, wherein the scheduling information is scrambled by a dedicated identifier, and the scheduling information is used for indicating that the data is rescheduled to one of the following locations: other time domain locations, other frequency domain locations, other carriers and other beams; when the scheduling information fails to be detected within the predefined time, stop transmission or reception of the data, or performing the transmission or reception of the data on a reserved resource.

Figure 8:
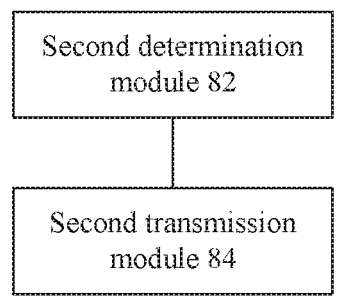
FIG. 8 is a block diagram 2 of a data transmission device according to an embodiment of the present disclosure.

FIG. 8 is a block diagram 2 of a data transmission device according to an embodiment of the present disclosure. As shown in FIG. 8, the device includes a second determining module 82 and a second transmission module 84 and the device is described below.

The second determination module 82 is configured to determine a second time domain resource for transmitting data according to second preset information, where the second preset information includes at least one of: indication information coming from a base station, a sensing result for a channel and a measurement result for interference; and the second transmission module 84 is connected to the second determination module 82 and is configured to transmit the data by using the determined second time domain resource.

In one optional embodiment, the sensing result for the channel includes at least one of: obtaining the sensing result by sensing occupation information transmitted by a downlink channel indicated by a preset base station; obtaining the sensing result by performing an energy measurement on a blank resource or a preset pattern.

In one optional embodiment, the device further includes a measurement module, which is configured to measure the interference before determining the second time domain resource for transmitting the data according to the second preset information through the following manner: performing interference measurement on a neighboring base station, and determining an interference of a link by measuring a cross link measurement signal, where the measurement signal includes at least one of: CSI-RS, DMRS, DRS.

In one optional embodiment, the second preset information further includes: preset indication information, where the preset indication information includes at least one of: a number of uplink and downlink transmission slots, a number of mini-slots, a number of symbols, a modulation and coding scheme (MCS) indication, a frequency domain resource location, a hybrid automatic repeat request (HARQ) process number information, transmission time domain location information of a cross link measurement signal, candidate transmission star time domain location information, transmission end time domain location information, a beam indication, power control information, frame structure configuration information, adjusted uplink and downlink configuration information or indication information adjusted by scheduling.

In one optional embodiment, the adjusted uplink and downlink configuration information is determined according to the sensing result for the channel and channel state information fed back by a terminal; and the indication information adjusted by scheduling is determined according to the sensing result for the channel and channel state information fed back by a terminal.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

The embodiment of the present disclosure further provides a storage medium. Optionally, in the embodiment, the storage medium may be configured to store program codes for executing the steps described above.

Optionally, in the embodiment, the storage medium described above may include, but is not limited to, a USB flash disk, a read-only memory (ROM), a random access memory (RAM), a mobile hard disk, a magnetic disk, an optical disk or various other media capable of storing program codes.

Optionally, in the embodiment, a processor executes the steps described above according to the program codes stored in the storage medium.

Optionally, for specific examples in this embodiment, reference may be made to the examples described in the above-mentioned embodiments and optional embodiments, and repetition will not be made in this embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

In solutions provided by embodiments of the present disclosure, since a first time domain resource for transmitting data is determined according to at least one piece of information (indication information coming from a base station, a sensing result for a channel and a measurement result for interference) included in first preset information, i.e., requirements of the interference and the traffic priority are considered, and requirements transmitted according to requirement adaption of uplink and downlink traffics are satisfied, reducing the data transmission interference, improving the data transmission probability and ensuring the system performance.

What is claimed is:

1. A data transmission method, comprising:
   determining a first time domain resource for transmitting data according to first preset information, wherein the first preset information comprises at least one of: indication information from a base station, a sensing result for a channel, or a measurement result for interference;
   transmitting the data by using the determined first time domain resource; and
   before determining the first time domain resource for transmitting the data according to the first preset information, the method further comprises: sensing the channel and/or measuring the interference through a following manner:
   performing channel sensing and/or interference measuring from a first sensing location in a sequential order of pre-configured candidate sensing locations; wherein in response to determining that a sensing result of the channel sensing and/or a measure result of the interference measuring at a nth candidate sensing location is less than a preset threshold, determining a start location of the nth candidate sensing location as a location for starting data transmission, wherein n=1, 2 . . . m, m is a total number of the candidate sensing locations configured for the channel sensing or the interference measuring, or a number of candidate time domain start locations for the data transmission; in response to determining that a sensing result of the channel sensing and/or a measure result of the interference measuring at each of all candidate sensing locations is greater than or equal to the preset threshold, determining a pre-configured uplink location as a location for the data transmission.

2. The method of claim 1, wherein the first time domain resource comprises a time domain start location and a time domain length.

3. The method of claim 2, wherein the time domain length comprises:
   k time units, wherein k is a variable and is an integer greater than or equal to 1; and
   each of the k time units comprises at least one of:
   a subframe, a slot, a mini-slot, or an orthogonal frequency division multiplexing (OFDM) symbol.

4. The method of claim 2, further comprising:
   in response to determining that the domain length of the first time domain resource dynamically changes, adjusting data transmission through at least one of manners:
   reperforming a rate matching according to an indicated MCS, wherein a value of the indicated MCS is a preset value or is an initial MCS value plus a plurality of offset values, and in response to determining that a plurality of indicated MCSs are provided, the plurality of indicated MCSs are on a one-to-one correspondence with candidate sensing locations;
   converting a transport block size for transmitting the data, and adjusting the transport block size; or
   transmitting the data according to scheduling information corresponding to the changed length of the first time domain resource.

5. The method of claim 4, wherein in response to determining that a physical uplink shared channel (PUSCH) starts transmitting from a qth scheduled slot, adjusting the transport block size comprises one of:
   after converting a number of allocated RBs to ((the number of RBs)*a), obtaining an integer number of RBs after a converted value is rounded up or down, and searching a table to determine the transmission block size according to the integer number of RBs and a modulation coding indication parameter $I_{MCS}$ indicated by a scheduling signaling;
   after determining, via a table, an initial transport block size (TBS) through the number of RBs and $I_{MCS}$ indicated by the scheduling signaling, performing an operation of TBS*a on an initial TBS to obtain a temporary TBS, searching a TBS value closest to the temporary TBS from a TBS table, and taking the TBS value closest to the temporary TBS in the TBS table as a TBS transmitted on the PUSCH; or keeping a code rate for transmitting the transport block unchanged, converting the TBS by a formula: (TBS+CRC)*a−CRC; searching a TBS closest to the converted TBS value from the TBS table as a TBS for transmitting the transport block, and performing encoding modulation according to $I_{MCS}$ indicated by the base station;

wherein q is a variable and is an integer greater than or equal to 1; a=(m−f+1)/m, f is a variable and is an integer greater than or equal to 1, and m comprises at least one of: m is a total number of scheduled slots, each of m scheduled slots in a time domain are continuous or discrete, m is the total number of the candidate sensing locations configured for the channel sensing or the interference measuring, or m is the number of candidate time domain start locations for the data transmission.

6. The method of claim 1, wherein the indication information comprises at least one of:
a media access control control element (MAC CE);
a radio resource control (RRC) message for configuring a plurality of candidate time domain start locations and time domain lengths;
downlink control information (DCI) for indicating an allocated time domain start location and a time domain length of scheduled data;
configuration adjustment information for indicating uplink and downlink structures of the first time domain resource;
information for indicating a candidate time domain location for sensing the channel;
information for indicating a candidate time domain location for measuring the channel;
information for indicating time domain start locations of a plurality of pre-configured candidate first time domain resources; or
parameter information for indicating a transmission of the data.

7. The method of claim 6, wherein the parameter information comprises at least one of:
a number of slots for a data transmission, a number of mini-slots, a number of symbols, a modulation and coding scheme (MCS) indication, a frequency domain resource location, hybrid automatic repeat request (HARQ) process number information, transmission time domain location information of a cross link measurement signal, transmission start time domain location information, transmission end time domain location information, a beam indication, or power control information;
wherein the parameter information is determined through one piece of DCI or at least two pieces of DCI.

8. The method of claim 7, wherein the two pieces of DCI satisfies at least one of following conditions:
the two pieces of DCI have different time domain locations;
first-level DCI in the two pieces of DCI comprises at least one of: a carrier indication, resource allocation, pilot resource allocation, an MCS, a scheduling transmission timing, an acknowledgement (ACK) or non-acknowledgement (NACK) feedback timing, a number of scheduled slots, power control, a HARQ process number, a new data indication, a redundancy version, a beam index indication, precoding information, a channel state request indication, a trigger transmission indication for aperiodic sounding signal, or a sensing access priority; or
a second-level DCI in the two pieces of DCI comprises at least one of: an adjusted carrier indication, adjusted resource allocation, an adjusted MCS, scheduling transmission trigger indication information, an adjusted transmission timing, an adjusted ACK/NACK feedback timing, an adjusted number of slots, adjusted power control, an adjusted HARQ process number, or an adjusted beam index.

9. The method of claim 8, wherein the two pieces of DCI satisfies at least one of following conditions:
the scheduling transmission timing of the first-level DCI is time domain offset information relative to a time domain location in which the second-level DCI is located; or
adjusted information comprised in the second-level DCI is one piece of offset information based on the first-level DCI.

10. The method of claim 6, wherein a unit adjusted by the configuration adjustment information comprises at least one of:
a subframe, a slot, a mini-slot, or an orthogonal frequency division multiplexing (OFDM) symbol.

11. The method of claim 6, wherein the configuration adjustment information performs configuration adjustment on the uplink and downlink structures of the first time domain resource through at least one of manners:
obtaining uplink and downlink configuration structures of subsequent k subframes or slots by the first-level DCI, obtaining slots for changing a frame structure by second-level user equipment specific (UE-specific) DCI or UE-group-specific DCI, wherein k is a variable and is an integer greater than or equal to 1;
obtaining an initial configuration configured by DCI or a semi-static RRC message, and obtaining the uplink and downlink configuration structures of the slots through common DCI;
obtaining the uplink and downlink configuration structures of the subsequent k subframes or slots by the common DCI, obtaining the first time domain resource changed information by an implicit indication by an uplink (UL) grant and/or a downlink (DL) grant; or
determining the uplink and downlink configuration structures by a structure of a reference signal.

12. The method of claim 1, wherein before determining the first time domain resource for transmitting the data according to the first preset information, the method further comprises: measuring the interference through a following manner:
determining a magnitude of cross link interference by measuring a specific signal, wherein the specific signal comprises a sounding signal or a demodulation reference signal transmitted by other terminals.

13. The method of claim 12, wherein after determining the magnitude of cross link interference by measuring the specific signal, the method further comprises:
informing in a predefined time window, according to a pre-configured cycle, the base station of a determined interference measurement result in an ACK or NACK implicit manner, or in a reporting manner of the channel state information (CSI).

14. The method of claim 1, wherein in response to determining that a time domain location of the first time domain resource changes, a new time domain location is determined in front of a time domain location of an ACK or a NACK message fed back by a receiving end.

15. The method of claim 1, wherein in response to determining that a time domain length of the first time domain resource changes, a location of a demodulation reference signal of the data remains unchanged, wherein the location of the demodulation reference signal of the data is a predefined location.

16. A data transmission device, comprising:
a processor; and
a memory for storing instructions executable by the processor,
wherein the processor is configured to:
determine a first time domain resource for transmitting data according to first preset information, wherein the first preset information comprises at least one of: indication information from a base station, a sensing result for a channel or a measurement result for interference;
transmit the data by using the determined first time domain resource; and
sense the channel and/or measure the interference through a following manner:
performing channel sensing and/or interference measuring from a first sensing location in a sequential order of pre-configured candidate sensing locations; wherein in response to determining that a sensing result of the channel sensing and/or a measure result of the interference measuring at a nth candidate sensing location is less than a preset threshold, determining a start location of the nth candidate sensing location as a location for starting data transmission, wherein n=1, 2 . . . m, m is a total number of the candidate sensing locations configured for the channel sensing or the interference measuring, or a number of candidate time domain start locations for the data transmission; in response to determining that a sensing result of the channel sensing and/or a measure result of the interference measuring at each of all candidate sensing locations is greater than or equal to the preset threshold, determining a pre-configured uplink location as a location for the data transmission.

17. A non-transitory storage medium, which is configured to store computer programs that, when executed by a processor, implement the steps of the method of claim 1.

* * * * *

UNITED STATES PATENT AND TRADEMARK OFFICE
CERTIFICATE OF CORRECTION

PATENT NO. : 11,160,088 B2
APPLICATION NO. : 16/476255
DATED : October 26, 2021
INVENTOR(S) : Li et al.

It is certified that error appears in the above-identified patent and that said Letters Patent is hereby corrected as shown below:

In the Specification

Column 14, Line 44-45, delete "As shown in FIG. 4a,".

Column 21, Line 46, delete "As shown in FIG. 5,".

Signed and Sealed this
Seventeenth Day of May, 2022

Katherine Kelly Vidal
*Director of the United States Patent and Trademark Office*